July 9, 1957     L. I. GOLDFISCHER     2,798,965
PHOTOELECTRIC TRIGGER CIRCUIT
Filed Sept. 27, 1954
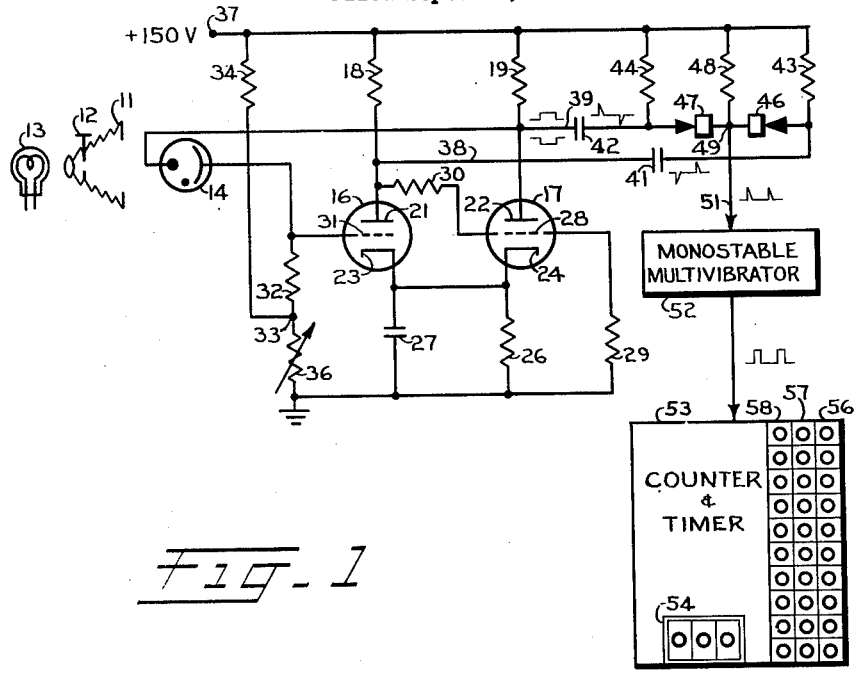
Fig. 1
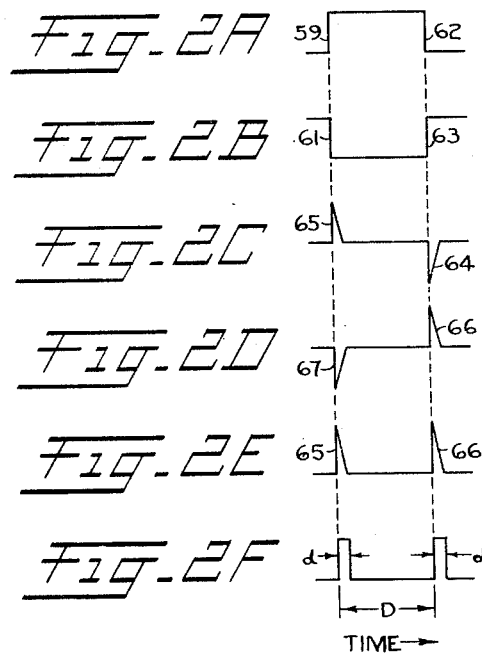
Fig. 2A
Fig. 2B
Fig. 2C
Fig. 2D
Fig. 2E
Fig. 2F
TIME →
INVENTOR.
LESTER GOLDFISCHER
BY
ATTORNEY United States Patent Office 2,798,965
Patented July 9, 1957

2,798,965

PHOTOELECTRIC TRIGGER CIRCUIT

Lester I. Goldfischer, New Rochelle, N. Y., assignor to General Precision Laboratory Incorporated, a corporation of New York Application September 27, 1954, Serial No. 458,434

5 Claims. (Cl. 250—214)

This invention relates to electrical devices for timing the duration of illumination, and more particularly to trigger circuits used in such apparatus.

In timing a flash or pulse of light conventional devices employ phototubes in circuits whose response is proportional to intensity of illumination, and which emit a very low energy output. In measuring the duration of a short period of light between selected low-intensity points such devices are likely to be marginal in their operation and moreover, are not as sensitive or as fast as is sometimes desired. In such cases photomultiplier tubes are useful to enhance sensitivity or speed of response.

The present invention employs a conventional two-element phototube in a simple circuit but secures a speed of response comparable to that obtainable with a photomultiplier tube. The present circuit is also very sensitive to low light intensities. The output signal produced by the circuit of the invention is a powerful rectangular pulse of potential applied to a relatively low impedance circuit. The front edge of the electrical pulse is triggered by the start of the light pulse at a predetermined level of light intensity, and the trailing edge of the electrical pulse is triggered when the trailing edge of the light pulse has diminished to a predetermined level of intensity. The output electrical signal may be of either positive or negative polarity or two pulses of opposite polarity.

When the duration of the output pulse or pulses of the device is to be measured in units of time, any of several conventional means may be employed, as the output pulse lends itself to easy manipulation. If in addition it is desired to display the time measurement this may be done by conventional means, using either analog or digital devices. The combination of the invention with time-measuring and display equipment thus constitutes what may be termed a photoelectric timer.

The applications of this invention are manifold. One obvious application, in combination with time-measuring units, is to calibrate a camera shutter. Another is to measure the duration of the light of a photoflash bulb between selected intensity levels. Any other light duration, long or short, may be measured.

However, the invention is particularly useful in connection with short light flashes of relatively low intensity, such as flashes of distant lightning or of an explosion. Since an electric lamp can be flashed in accordance with the duration of nearly any physical operation, the present invention can be applied to measure indirectly the duration of any action.

The purpose of this invention, then, is to provide simple equipment for measuring the duration of illumination.

More specifically, this invention with accessory apparatus provides means for measuring duration of illumination in terms of time units, and for displaying the result.

A fuller understanding of this invention may be secured from the detailed description together with the drawings, in which:

Figure 1 is a schematic circuit of the instrument of the invention combined with other components to depict one use of the invention.

Figures 2A, 2B, 2C, 2D, 2E and 2F are graphs having voltage ordinates and the same time axis, indicating waveforms at points in the circuits of Fig. 1.

Referring now to Fig. 1, measurement of the duration of opening of a photographic camera shutter is selected as an example of a use to which this invention may be put. The back of a camera 11 is opened so that light may be shone through its iris diaphragm shutter 12. A source of illumination consisting of an incandescent lamp 13 is placed on one side of the shutter, and a phototube 14 is placed on the other side of the shutter so that the lamp 13, the aperture of shutter 12, and the phototube 14 all lie in the same straight line.

The phototube 14 may be of any type; however for the purpose of example a gas phototube of the type 1P37 is employed.

The phototube is connected as an essential part of a trigger circuit comprising two triodes 16 and 17. Two anode resistors 18 and 19 supply positive potential to the anodes 21 and 22 of the triodes, and their cathodes 23 and 24 are connected together and grounded through a common resistance 26 shunted by capacitance 27. The control grid 28 of triode 17 is connected to ground through resistor 29 and is also connected to the anode 21 of the triode 16 through resistor 30. The control grid 31 of triode 16 is connected through resistor 32 to the intermediate terminal 33 of a voltage divider consisting of fixed resistor 34 and adjustable resistor 36. This voltage divider is connected between the positive potential terminal 37 and ground. By adjusting resistor 36 the potential of terminal 33 is controlled.

The outputs of the trigger circuit, which in the contemplated mode of use consist of rectangular pulses of potential of opposite sense at the two anodes 21 and 22, are transmitted through conductors 38 and 39 to two series capacitors 41 and 42. These capacitors in combination with shunt resistors 43 and 44 respectively constitute two differentiating circuits. The differentiated output signals, each consisting of a positive and a negative potential sharp pulse or spike, are next applied to electronic limiters or clamps which cut off the negative spikes and allow the positive spikes to pass. These limiters consist of unidirectionally conductive elements 46 and 47, which may be crystal diodes, and the load resistor 48, the diodes being poled for passage of the positive spikes. Potential output is taken from the common diode terminal 49 and consists of two positive spikes, one marking the time of beginning of the trigger circuit pulse output and one marking the end.

The double sharp pulse output is applied from terminal 49 through conductor 51 to a monostable multivibrator 52. This multivibrator is so designed as to be put in its unstable state upon application to it of a positive spike, after which it spontaneously returns to its stable state after a time interval determined by its constants of design. The output of the monostable multivibrator, when excited by a pair of positive spikes having a definite separation, thus consists of a pair of rectangular positive pulses having the same definite separation measured between their front edges. These rectangular pulses, having considerable power, may be employed to actuate any desired display equipment.

In place of a monostable multivibrator as described triggered twice by a pair of sharp positive pulses, a monostable multivibrator of conventional design may be employed which is triggered by either a positive or negative pulse. Then in Fig. 1 the circuit output is taken from only one of the anodes 21 and 22, either conductor 38 or conductor 39 being omitted. The positive and negative pulse outputs from the differentiating circuit are then segregated by diodes which may form part of the monostable multivibrator circuit 52, and are applied respectively to the two control grids thereof, resulting in the pair of rectangular pulses previously described as the output of the monostable multivibrator 52.

The display equipment 53 actuated by the output of monostable multivibrator 52 may be of any type providing an electronic, lamp, or written display, and either of the analog or digital type. An example of the latter consists of a counter and timer containing a frequency standard, together with cycle counting circuits opened and closed by the application of rectangular positive pulses. The display consists of a decimal indicating mechanical counter 54 for displaying decimal digits representing the thousands, ten-thousands, and hundred-thousands places of a decimal number. The units, tens and hundreds place values are indicated by the three columns 56, 57 and 58 respectively of an electrical decimal counter. Each column contains ten neon lamps numbered from zero to nine from top to bottom. When a number has been set up, one lamp in each column will be lit, indicating the value of the digit. One such counter and timer commercially available is the Berkeley Universal Counter and Timer Model 5500 made by the Berkeley Division of Beckman Instrument, Inc.

In the operation of the circuit of Fig. 1, when no light falls on phototube 14 its resistance is measured in thousands of megohms, so that in comparison with the other circuit values it may be considered as an open circuit. The potential of grid 31 is therefore that of intermediate terminal 33, cutting off triode 16, and current flows only in triode 17. The grid 28 and cathode 24 are clamped together, the anode-cathode current being determined by the values of the cathode resistor 26 and anode resistor 19 for zero grid-to-cathode voltage. All resistor values are such that, by change of the adjustable resistor 36 the potential of the grid 31 may be moved from below its cutoff value at these given conditions to above its cutoff value. If the latter should be done the current flow is regeneratively transferred from tube 17 to tube 16, due to the double coupling through resistors 30 and 26. Upon lowering the potential of grid 31 the reverse trigger action regeneratively occurs.

In order to secure the highest sensitivity of this circuit to illuminaton applied to phototube 14, the potential of grid 31 is placed below cutoff but as near as possible to cutoff without making the circuit subject to triggering by fortuitous electrical disturbances, or "noise." Any adjustment of grid 31 at a less positive potential than this makes the circuit less sensitive. That is, the phototube 14 will trigger the circuit at a higher level of illumination.

In considering the operation of the circuit let it be supposed that the shutter 12 of camera 11 is opened for a period of .01 second, permitting light from lighted lamp 13 to fall on the sensitive surface of phototube 14, and let it be supposed that the light is sufficient to trigger the circuit. When light falls on phototube 14 its resistance drops so that the potential of grid 31 becomes the intermediate potential between terminals 37 and 33 controlled by resistor 32, phototube 14 and resistor 19 in series serving as a voltage divider. The potential of grid 31 being thus considerably elevated and above cutoff, triode 16 conducts, producing a potential drop in anode resistor 18 of such magnitude as to bring grid 28 near to or below cutoff. This reduces the current in anode resistor 19, thus increasing the potential of grid 31. Since the action is thus regenerative the speed with which current is transferred from tube 17 to tube 16 is very high and produces a very steep output pulse front. Removal of current from anode 22 causes an abrupt increase of potential in its conductor 39, and the start of current flow in anode 21 causes a corresponding drop in the potential of its conductor 38. These potential changes are indicated at 59 and 61, respectively, of Figs. 2A and 2B, representing change of potential with time, and are nearly instantaneous even when the light increase which triggers them is gradual.

At the end of the illumination period of .01 second the high resistance of phototube 14 is restored, reducing the potential of grid 31 to below its cutoff value, as before. This action also is regenerative so that, even though the illumination reduction be gradual, the transfer of current from tube 16 to tube 17 is abrupt. This current change is accompanied by corresponding potential changes in conductors 39 and 38 indicated in Figs. 2A and 2B at 62 and 63.

The square wave pulses of Figs. 2A and 2B are differentiated by capacitance 42 taken with resistance 44, and capacitance 41 taken with resistance 43, and produce the differentiated wave forms indicated in Figs. 2C and 2D.

The diode 47 clips the negative spike 64, Fig. 2C while passing without alteration the positive spike 65. Similarly the diode 46 clips the negative spike 67 Fig. 2D while passing without alteration the positive spike 66. Both spikes 65 and 66 are illustrated in Fig. 2E as combined in a single wave form since both are present at the terminal 49 and are applied to the conductor 51.

These spikes are made to excite the multivibrator 52 to produce the narrow rectangular pulses shown in Fig. 2F. The distance D between the fronts of the rectangular pulses is the measured duration of the illumination. The duration $d$ of each pulse may be whatever is desired so long as it is less than D by more than the deionization time of the phototube.

The distance D between the fronts of the rectangular pulses is measured in units of time by timer 53 as before described, providing a decimal digital display indicating the duration of illumination with an accuracy on the order of 1%.

It is obvious that, in place of the triode discharge tubes 16 and 17, Fig. 1, pentodes could be used or, under certain conditions tetrodes. Alternatively other equivalent circuits arrangements could be used, including direct connections between cathode and ground.

What is claimed is:

1. A photoelectric trigger circuit comprising, first and second discharge tubes each having at least an anode, cathode and control grid, an anode resistor connected to the anode of each of said tubes, said anode resistors being connected to a positive potential terminal, a grid bias resistor connecting each control grid to a fixed potential terminal, a resistor connecting the anode of said first tube to the control grid of said second tube, and photoelectric means connecting the anode of said second tube to the control grid of said first tube.

2. A photoelectric trigger circuit for emitting a rectangular electrical pulse when illuminated comprising, first and second discharge tubes each having at least an anode, cathode and control grid, an anode load resistor connected to the anode of each said tube, said anode resistors being connected to a positive potential terminal, a grid bias resistor connecting each control grid to a fixed potential terminal, a resistor connected from the anode of said first tube to the control grid of said second tube whereby during non-illumination the second tube is conductive, and a phototube having its anode connected to the anode of said second tube and having its cathode connected to the control grid of said first tube, whereby upon illumination current flow is abruptly transferred from said second tube to said first tube resulting in rectangular potential pulses at both anodes.

3. A photoelectric trigger circuit for emitting a rectangular electrical pulse when illuminated comprising, first and second discharge tubes each having at least an anode, cathode and control grid, an anode load resistor connected to the anode of each said tube, a bypassed common cathode resistor connected between the joined cathodes of said tubes and a terminal of fixed potential, a grid resistor connected between the control grid of said second tube and said fixed potential point, another grid resistor connected between the control grid of said first tube and a second fixed potential point higher in potential than said first mentioned fixed potential point, a resistor connected from the anode of said first tube to the control grid of said second tube whereby during non-illumination the second tube is conductive, and a phototube having its anode connected to the anode of said second tube and having its cathode connected to the control grid of said first tube, whereby upon illumination current flow is abruptly transferred to said first tube and current flows in the first tube alone during illumination, resulting in rectangular potential pulses at both anodes.

4. A photoelectric trigger circuit comprising, a pair of trigger tubes each having at least an anode, cathode and control electrode, a common cathode resistor connected to said cathodes, anode resistors connected to each of said anodes, a potential source connected between said anode resistors and said cathode resistor, means for applying fixed bias potentials to each of said control electrodes, the fixed bias potential applied to the control electrode of one of said tubes being higher than that applied to the control electrode of the other of said tubes whereby said one tube is normally conductive and said other tube is normally nonconductive, a resistor interconnecting the control electrode of said one tube and the anode of said other tube, and photoelectric means connecting the anode of said one tube to the control electrode of said other tube whereby illumination of said photoelectric means renders said one tube nonconductive and said other tube conductive.

5. A photoelectric trigger circuit comprising, a pair of trigger tubes each having at least an anode, cathode and control electrode, a source of potential, a common cathode resistor connected between said cathodes and a low potential terminal of said source, anode resistors connected between each of said anodes and a high potential terminal of said source, a resistor connecting the control electrode of one of said tubes to said low potential terminal, a resistor interconnecting the anode of the other of said tubes and the control electrode of said one tube, a potential divider connected between said high and low potential terminals, a resistor connected between the control electrode of said other tube and an intermediate terminal of said potential divider, and electronic photosensitive means connected between the control electrode of said other tube and the anode of said one tube.

References Cited in the file of this patent

UNITED STATES PATENTS

| | | |
|---|---|---|
| 2,389,991 | Mayle | Nov. 27, 1945 |
| 2,484,299 | Labrum | Oct. 11, 1949 |
| 2,515,630 | Chang | July 18, 1950 |
| 2,659,823 | Vossberg | Nov. 17, 1953 |